(12) United States Patent
Breuer

(10) Patent No.: US 12,177,833 B2
(45) Date of Patent: Dec. 24, 2024

(54) METHOD FOR OPTIMIZATION OF DEDICATED UPLINK RESOURCE TRANSMISSION

(71) Applicant: Telit Cinterion Deutschland GmbH, Munich (DE)

(72) Inventor: Volker Breuer, Boetzow (DE)

(73) Assignee: Telit Cinterion Deutschland GmbH, Munich (DE)

( * ) Notice: Subject to any disclaimer, the term of this patent is extended or adjusted under 35 U.S.C. 154(b) by 362 days.

(21) Appl. No.: 17/641,512

(22) PCT Filed: Sep. 7, 2020

(86) PCT No.: PCT/EP2020/074960
§ 371 (c)(1),
(2) Date: Mar. 9, 2022

(87) PCT Pub. No.: WO2021/048058
PCT Pub. Date: Mar. 18, 2021

(65) Prior Publication Data
US 2022/0330288 A1 Oct. 13, 2022

(30) Foreign Application Priority Data

Sep. 11, 2019 (EP) ..................................... 19196779

(51) Int. Cl.
*H04W 72/12* (2023.01)
*H04L 1/1607* (2023.01)
*H04W 72/1268* (2023.01)

(52) U.S. Cl.
CPC ....... *H04W 72/1268* (2013.01); *H04L 1/1607* (2013.01)

(58) Field of Classification Search
CPC .......... H04W 72/1268; H04W 72/0446; H04L 1/1607; Y02D 30/70
See application file for complete search history.

(56) References Cited

U.S. PATENT DOCUMENTS 10,999,885 B1 * 5/2021 Shih ...................... H04W 76/19
11,690,086 B2 * 6/2023 Phuyal .................. H04W 76/27
370/329

(Continued)

FOREIGN PATENT DOCUMENTS

EP 3386265 A1 10/2018

OTHER PUBLICATIONS

International Search Report (PCT/ISA/210) and Written Opinion (PCT/ISA/237) mailed on Nov. 9, 2020, by the European Patent Office as the International Searching Authority for International Application No. PCT/EP2020/074960—[12 pages].

*Primary Examiner* — Jay P Patel
(74) *Attorney, Agent, or Firm* — PEARL COHEN ZEDEK LATZER BARATZ LLP

(57) ABSTRACT

Provided is a method for a method to operate a base station being part of a cellular network, the base station being configured for conducting a preconfigured periodical uplink communication schedule with at least one user equipment. The base station negotiates with the user equipment for setting up the preconfigured periodical uplink communication schedule. A downlink data flag indicating if the user equipment is prepared to receive downlink data in conjunction with at least one preconfigured periodical uplink communication occasion is received. Network resources are allocated at a time synchronized with the preconfigured periodical uplink communication schedule of a data transmission as part of a preconfigured periodical uplink communication occasion. Other embodiments are disclosed.

16 Claims, 3 Drawing Sheets

(56) References Cited

U.S. PATENT DOCUMENTS

| | | | |
|---|---|---|---|
| 2005/0018624 A1 | 1/2005 | Meier et al. | |
| 2011/0075604 A1* | 3/2011 | Fong | H04L 63/162 |
| | | | 370/328 |
| 2015/0304943 A1* | 10/2015 | Fong | H04W 8/26 |
| | | | 370/329 |
| 2018/0352424 A1* | 12/2018 | Byun | H04W 76/30 |
| 2019/0045437 A1 | 2/2019 | Krishnamoorthy et al. | |
| 2021/0385834 A1* | 12/2021 | Morozov | H04W 52/0216 |

* cited by examiner

METHOD FOR OPTIMIZATION OF DEDICATED UPLINK RESOURCE TRANSMISSION

CROSS-REFERENCE TO RELATED APPLICATIONS

This application is a National Phase Application of PCT International Application No. PCT/EP2020/074960, International Filing Date Sep. 7, 2020, claiming priority to European Patent Application No. 19196779.3, filed Sep. 11, 2019, which is hereby incorporated by reference.

FIELD OF THE INVENTION

The present invention relates to a method for a base station of a cellular network. The invention also pertains to a base station using said method.

The invention further relates to a method for a user equipment operating with said base station. The invention also pertains to a user equipment using said method.

BACKGROUND OF THE INVENTION

Generally, in the field of cellular wireless communication there have recent been improvements for data transmission of simple IoT devices, that regular submit a practically constant amount of data. This is in particular known for metering devices, or other sensors, which e.g. once a day submit in a data packet the amount of consumed fuel, electricity, the measured amount of rain, or whatsoever. This type of communication needed with the legacy cellular networks an immense overhead of signalling for setting up the communication context, allocating resources etc., but then sending a data packet of a few bytes. This is very disadvantageous and in particular leads to a bad usage of the available network resources, in particular on the air interface.

For solving this problem, approaches were discussed, where once a setup of a timewise cyclic communication is suggested, and without further notice the cellular network allocates at the respective scheduled time the necessary amount of resources. This is called preconfigured periodical uplink communication. The proposal was adopted in the 4G standard under the term Dedicated Pre-Allocated Uplink Resources (D-PUR).

However, this approach does for certain applications still not provide an optimal way of data transmission. By now the D-PUR approach is implemented by way of a PRACH message flow, which leads after transmission of the data packet to a check of possibly available data for the user equipment. This check is done between eNodeB and connected MME whilst UE has to wait/receive unless a message is sent from eNodeB. If so, then a RRC transmission is set up, and the downlink transmission may be effected. If not, a layer-1 acknowledgment is provided, and the user equipment may return to idle. The layer-1 acknowledgement is part of the HARQ ACK/NACK mechanism and confirms to the sender, that the data are arrived safe and sound at the receiver. For some types of user equipment this approach is still oversized. This is the case, as they are not configured to consider if their data have successfully arrived at the receiver. Further if it is disadvantageous to wait for a feedback whether data for a RRC transmission are available.

It is therefore the goal of present invention to overcome the mentioned disadvantages and to propose a solution for an optimized preconfigured periodical uplink communication by such user equipments.

Further alternative and advantageous solutions would, accordingly, be desirable in the art.

SUMMARY OF THE INVENTION

For this it is according to a first aspect of the invention suggested a method to operate a base station according to claim 1. It is further suggested according to a second aspect of the invention a base station according to claim 6. In the third aspect of the invention it is proposed a method for a user equipment according to claim 11. It is further suggested according to the fourth aspect of the invention a user equipment according to claim 14.

According to the first aspect of the invention it is proposed a method to operate a base station being part of a cellular network, said base station being configured for conducting a preconfigured periodical uplink communication schedule with at least one user equipment, the method comprising the step for the base station of negotiating with the user equipment for setting up the preconfigured periodical uplink communication schedule, further comprising receiving a downlink data flag indicating if the user equipment is prepared to receive downlink data in conjunction with at least one preconfigured periodical uplink communication occasion, after setup of the preconfigured periodical uplink communication schedule, allocating network resources at a time synchronized with the preconfigured periodical uplink communication schedule of a data transmission as part of a preconfigured periodical uplink communication occasion, wherein a check for availability of downlink data for the user equipment is evaluated in advance of the next preconfigured periodical uplink communication occasion only in case the downlink data flag indicates to check for downlink data, and the method further comprising for the base station during said preconfigured periodical uplink communication occasion:

receiving uplink data from the user equipment with a data message, sending an indication to the user equipment for setting up a downlink data connection only in case the check for availability of downlink data turned out availability of downlink data.

The invention relates to a base station of a cellular network. The cellular network for wireless communication is preferably covering a large area with a plurality of base stations, each covering a cell. The cellular network resp. its base stations are supporting in particular one or more of the wireless communication technology standards of 2G (GSM), 3G (UMTS), 4G (LTE), 5G (New Radio) and beyond.

In particular the later technology standards are designated for supporting a variety of user equipments, e.g. mobile handsets, machine-type communication (MTC) devices, also known as IoT (Internet-of-Things)-devices.

In particular the latter type of user equipments is operating in a regular data exchange schedule, e.g. sending once a day, or hour etc. a defined set of data to a remote server. For that it was originally necessary to setup each time a data connection, including requesting resources, getting such resources approved—if available—sending the data packet, and ending the connection and going into idle mode, or even a sleep mode.

This legacy procedure was disadvantageous for the user equipment, as it requires a lot of energy to carry out the steps, although in extreme cases only a few bytes—e.g. the measured amount of power consumption of a household in case of an electricity meter—are transmitted. Moreover the IoT device cannot be sure to get the resources granted in case of an overload situation. But also for the cellular network this procedure is disadvantageous as it requires a lot of signalling, for transmitting only minor payload, which could increase the risk of congesting the cellular network at certain cells.

For that purpose a new transmission scheme was introduced providing preconfigured periodical uplink communication (PPUC). For 4G networks this scheme is known under the term D-PUR, meaning dedicated pre-allocated uplink resources. The general concept of such transmission schemes is that the user equipment—in particular an IoT device, or at least the communication unit of it—negotiates once with the cellular network, in particular the currently serving base station, that it will submit a certain amount of data in a predefined schedule, e.g. once an hour. When the base station agrees, then for each preconfigured periodical uplink communication occasion, that is a scheduled time when the data transmission is scheduled, the required resources are already allocated. The schedule is in particular defined by an offset in terms of seconds, system frames etc. compared to the last PPUC occasion, in particular the beginning or end, or any other anchor point, like the time of negotiation.

Then the user equipment can with a first message send a so called PRACH request, receives in response a second message, preferably including a temporary UE ID, like the RNTI (Radio network temporary identifier) and a timing advance (TA) value. With the third message the user equipment sends, considering RNTI and TA, the payload data to the base station for forwarding to the addressed remote server.

By now the known PPUC schemes comprise further that during a PPUC occasion it is checked if downlink data are available, and with a layer-1 acknowledgment message to the user equipment it is both indicated that the data transmission was successful and if downlink data are available. If so, then a data transmission, in particular by way of an RRC connection is setup and used for downlink data transmission.

Such downlink data in particular comprise configuration modifications or software updates, and may require far more resources than the regular uplink data transmission during one PPUC occasion.

However, it is comparably rare that downlink data are available. Further this approach has the disadvantage that it requires additional time to check for downlink data, and then send the Layer-1 (L1)-acknowledgement message with or without the indication that downlink data are available. Moreover for a lot of use cases—e.g. simple sensors—it is not even important to receive an acknowledgement for their data transmission. It is like a thermometer that shows the temperature or a clock that shows the time: both have no necessity to know if the reader can read the time or temperature. In particular the behaviour would not change.

Here is where the inventive method comes into play. It is suggested, that—in particular during the step of negotiating the setup of the preconfigured periodical uplink schedule, in particular the D-PUR communication—the base station receives from the user equipment a downlink data flag. This is an indication which is supposed to inform the base station, if the user equipment is prepared, which means ready or willing, to receive downlink data in conjunction with one or more PPUC occasions.

Alternatively the downlink data flag is submitted later, in particular with the first message.

Should this be the case then the base station is already in preparation of the next PPUC occasion supposed to check the availability of downlink data for the user equipment in advance of the next PPUC occasion. This is advantageous as it saves time during the PPUC occasion. Further it is preferably only carried out, if the user equipment is prepared to receive downlink data in conjunction with a PPUC occasion.

When the PPUC occasion in fact is started according to the PPUC schedule, then the method comprises reception of uplink data from the user equipment with a data message, which is preferably the third message mentioned before. Depending on the downlink data flag the next step is carried out: If the check for availability of downlink data showed that downlink data are available, this is indicated to the user equipment. This is preferably done with a L1-acknowledgement message.

The check for availability of downlink data however can only indicate that data are available, if it was actually carried out. As this is only the case when the downlink data flag triggers this check, the step of sending an indication to the user equipment is only carried out, in case the downlink data flag has indicated that the user equipment is prepared to receive downlink data.

Alternatively, but less advantageously the base station could also check in any case for the availability of downlink data, but would in dependence of the downlink data flag decide to send the indication, when available data are found. For the base station this would mean additional work, but could simplify behaviour. This option is encompassed by the invention.

After this step was carried out the user equipment is preferably returning to idle mode, in particular when no downlink data are found to be available, resp. the downlink data flag indicated not to check for downlink data. This step might also involve procedure steps from base station assisting the switch to idle mode.

Otherwise the procedure would continue as originally defined, e.g. for D-PUR, that a RRC connection is set up and the downlink data transmission is about to take place. After that, the user equipment preferably switches to idle mode, or even a kind of sleep mode.

The inventive method shows, that not only the user equipment but also the base station is relieved from additional steps, in case the user equipment is not interested in downlink data transmissions. This leads to a faster execution of each PPUC occasion and reduces the amount of data transmission.

In an advantageous embodiment it is proposed that the method further comprising receiving an acknowledge flag indicating if acknowledged communication is preferred by the user equipment as part of the negotiating step, wherein after the step of receiving uplink data from the user equipment submitting a layer-1 acknowledgement message only in case said acknowledge flag indicates that acknowledged communication is preferred.

This embodiment suggests that the base station additionally receives from the user equipment an acknowledge flag. This is preferably carried out during the negotiation step for the PPUC schedule. The acknowledge flag is dedicated to indicate to the base station, if the user equipment is interested in the acknowledgment of a data transmission message during a PPUC occasion. Hence, the base station submits the layer-1 acknowledgment message—either indicating that the data message was successfully retrieved or that it was not successfully retrieved by the base station—to the user equipment in response to the data message only, when the acknowledge flag indicates that acknowledged communication is preferred by the user equipment.

If this condition is not fulfilled—the acknowledge flag e.g. indicates a "false"—then the layer-1 acknowledge message is omitted by the base station.

As a matter of fact, this embodiment saves another message for each PPUC occasion, which is advantageous for the base station in terms of congestion, and for the user equipment in terms of power consumption.

With this embodiment, the user equipment can directly switch to idle mode after sending the uplink data to the base station, in case no downlink data are expected. Together with the time improvement of the inventive method for saving the waiting time for a downlink data check, the whole PPUC occasion is handled much quicker than it is known by now. This also means, that less power resources are wasted, and less radio signalling is taking place, thus using less radio resources.

Preferably the layer-1 acknowledgement message further comprises said indication for setting up the downlink data connection.

Should the user equipment be prepared to receive downlink data in conjunction with a PPUC occasion, it will most likely also listen to the layer-1 acknowledgement message. Therefore it is advantageous to combine such information in one message rather than separate them.

According to another preferred embodiment it is proposed that the availability check comprises the steps of requesting from at least one cellular network component if data dedicated for said user equipment are available for downlink transmission.

This embodiment relates to the availability check for downlink data. If this is carried out, then the base station checks with at least one cellular network component if data dedicated for said user equipment are available.

Preferably said user equipment is indicated in said request by RNTI/TMSI. The at least one cellular network component in particular comprises a cellular network component directly linked to the HLR. From there configuration updates might be available.

Additionally or alternatively an access to a remote server via the SAE or PDN gateway is carried out, and through this any updates covered by the remote server—e.g. the data collection server of a metering management service—are meant to be made available to the user equipment.

According to a preferred embodiment it is suggested that in case of availability of downlink data and said downlink data flag indicating that the user equipment is not prepared to receive downlink data, sending a message asynchronously to the preconfigured periodical uplink communication by means of paging to the user equipment.

With this embodiment it is assured that downlink data are made available for the user equipment even though it indicated in the downlink data flag that it is not prepared to receive downlink data in conjunction with a PPUC occasion. However other occasions might be available, where either the user equipment initiatively—e.g. once a week—requests at the cellular network, resp. the remote server for downlink data. Or the user equipment is informed by way of paging, that data are available.

This requires however that the user equipment is configured to listen for paging at that time. Preferably also here paging windows might be agreed between the user equipment and the cellular network or the remote server to allow this type of downlink data transmission.

Collocating PPUC and paging occasions in case of similar density is an advanced method which requires also information exchange on PPUC assignment by the eNodeB and the MME assigning the paging occasions. Furthermore and advantageous the UE may also request D-PUR periodicity accordingly, i.e. especially in accordance to the SIB-2 related general paging density information.

According to the second aspect of the invention it is proposed a base station being part of a cellular network, said base station being configured to conduct a preconfigured periodical uplink communication schedule with at least one user equipment, wherein the base station is configured to negotiate with the user equipment for setting up the preconfigured periodical uplink communication schedule, wherein said negotiation comprises receiving a downlink data flag indicating if the user equipment is prepared to receive downlink data in conjunction with at least one preconfigured periodical uplink communication occasion, after setup of the preconfigured periodical uplink communication schedule, the base station is configured:

to allocate network resources at a time synchronized with the preconfigured periodical uplink communication schedule of a data transmission as part of a preconfigured periodical uplink communication occasion, to evaluate a check for availability of downlink data for the user equipment in advance of the next preconfigured periodical uplink communication occasion only in case the downlink data flag indicates to check for downlink data, and the base station is further configured during said preconfigured periodical uplink communication occasion to receive uplink data from the user equipment with a data message, send an indication to the user equipment for setting up a downlink data connection only in case the check for availability of downlink data turned out availability of downlink data.

The base station according to this aspect of the invention is one of a plurality of base stations of a cellular network covering a cell area. The base station comprises in particular processing circuitry, receiving and transmitting circuitry for radio communication, as well as—preferably wired—communication circuitry for being communicatively coupled to other components of the cellular network, like those entities, servers and gateways from the Evolved Packet Core, or the NextGen Core.

The base station further comprises volatile and or permanent memory circuitry and at least one antenna.

The base station according to this embodiment is configured to serve one or more user equipments. It is further configured to support preconfigured periodical uplink communication (PPUC) schedules.

The base station is configured to negotiate with at least one of the served user equipments the PPUC schedules, and to allocate for each PPUC occasion sufficient radio resources for receiving the uplink data message from the user equipment with which the PPUC schedule is agreed upon. As part of this negotiation the base station is further configured to receive a downlink data flag from the user equipment, indicating if the user equipment is prepared to receive downlink data. If this is not the case, the base station refrains from taking the respective steps for checking availability of downlink data, and informing the user equipment about the availability of downlink data.

Further preferably the base station receives an acknowledge flag from the user equipment indicating if acknowledged communication is preferred by the user equipment. If this is not the case, the base station is further configured to refrain from sending acknowledgement messages to the user equipment in response to a data transmission message of the user equipment.

The base station is preferably further configured to support the user equipment when switching in idle mode after the end of the PPUC occasion.

The second aspect of the invention shares the advantages of the first aspect of the invention.

According to the third aspect of the invention it is proposed a method for a user equipment being configured for conducting preconfigured periodical uplink communication with a base station of a cellular network, the method comprising the step for the user equipment of negotiating with the base station for setting up the preconfigured periodical uplink communication schedule, said negotiation step comprising sending a downlink data flag indicating to be prepared to receive downlink data in conjunction with at least one preconfigured periodical uplink communication occasion, and the method further comprising during said preconfigured periodical uplink communication occasion:

sending uplink data from to the base station with a data message, receiving an indication from the base station for setting up a downlink data connection only when the downlink data flag indicates that the user equipment is prepared to receive downlink data, returning to idle mode afterwards.

The third aspect of the invention relates to a method for a user equipment which is operating with a base station according to the second aspect of the invention. For camping and registering the user equipment needs to provide subscription credentials to a base station, it is supposed to camp on for registration in the cellular network, e.g. after powering up.

When the user equipment is camping on the base station, it is generally able to start a connected mode session, e.g. a data exchange session, in particular with a remote server located in the internet, and reachable through the cellular network.

For a special type user equipment the concept of preconfigured periodical uplink communication (PPUC) was introduced, which is known for LTE networks as D-PUR.

This comprises that the user equipment negotiates with the serving base station to establish a PPUC schedule. This comprises a time indication, e.g. an offset to an anchor point in time, when the base station has independently sufficient radio resources for the agreed data transmission of the user equipment. According to this aspect of the invention it is further suggested to send a downlink data flag to the base station, in particular as part of the negotiation step. Alternatively this is sent per PPUC occasion, in particular in the first message.

This downlink data flag is dedicated to inform the base station if the user equipment is prepared to receive downlink data in conjunction with a PPUC occasion. This would require, to expect after each data transmission in course of a PPUC occasion to receive an indication, that a downlink data transmission will be setup, in particular by means of an RRC connection.

If the user equipment is not prepared for this, it indicates, preferably as part of the negotiation step, with the downlink data flag, not to accept downlink data. When a PPUC occasion is happening, then the user equipment sends with a first message a PRACH preamble to the base station. In response it receives with a second message a timing advance value and a UE identification, in particular a RNTI.

Considering these received values then the user equipment sends with the third message, the so-called data message, a data packet in the size fitting to the negotiated data packet size, for which sufficient radio resources are allocated by the base station.

If the user equipment indicated with the downlink data flag not to be prepared to receive downlink data, it does not need to expect, in particular in the layer-1 acknowledgement message in response to the data message, any indication regarding availability of downlink data. Hence it can preferably switch to idle mode then, or even a sleep mode or the like.

This is advantageous for the user equipment as it can save power consumption with each PPUC occasion. Further it simplifies the PPUC occasion. When the base station does not have to check for downlink data, this additionally speeds up the procedure and allows the user equipment switch to idle mode.

Should however the user equipment have indicated to be prepared for downlink data, it would need to evaluate the layer-1 acknowledgement message for an indication of available downlink data. If so, a RRC connection would be set up afterwards and the downlink data transmission would happen to be executed.

According to another embodiment of this aspect of the invention it is proposed sending an acknowledge flag indicating if acknowledged communication is preferred by the user equipment as part of the negotiating step, wherein after the step of sending uplink data from the user equipment receiving a layer-1 acknowledgement message only in case said acknowledge flag indicates that acknowledged communication is preferred.

With this embodiment the user equipment can in particular decrease the duration of a PPUC occasions further and reduce the power consumption even further.

For that the user equipment informs, preferably during negotiation, the base station with an acknowledge flag, if it is expecting to get a layer-1 acknowledge message for the data message.

If this is not the case, the base station is led by this acknowledge flag not to send a layer-1 acknowledgment message to the user equipment, regardless if the data message was successfully transmitted or not.

With this embodiment the user equipment can even earlier switch to idle mode, which is in the ideal situation directly after submitting the data message.

A user equipment is in particular not interested in the layer-1 acknowledgment message, when it without further context transmits with the data message a current measurement value or a status information, which does not necessarily trigger any action, which is of interest for the user equipment.

Preferably the layer-1 acknowledgement message further comprises said indication for setting up the downlink data connection.

This embodiment is preferable for user equipments which prefer to deactivate and activate acknowledgment and downlink data availability check as a whole. It is advantageous if a user equipment wants to be informed about downlink data availability also to allow layer-1 acknowledgement, and vice versa.

According to the fourth aspect of the invention it is proposed a user equipment being configured for conducting preconfigured periodical uplink communication with a base station of a cellular network, wherein the user equipment is configured to negotiate with the base station for setting up the preconfigured periodical uplink communication schedule, said negotiation comprising to send a downlink data flag indicating to be prepared to receive downlink data in conjunction with at least one preconfigured periodical uplink communication occasion, and the user equipment is further configured during said preconfigured periodical uplink communication occasion:

to send uplink data from to the base station with a data message, to receive an indication from the base station for setting up a downlink data connection only when the downlink data flag indicates that the user equipment is prepared to receive downlink data, to return to idle mode afterwards.

The user equipment in this aspect of the invention in particular comprises transmitting and receiving circuitry, in particular a transceiver, processing circuitry for controlling the transceiver and processing the protocol stack software, memory circuitry and an antenna. Further it preferably provides secured storage circuitry for securely storing subscription credentials for authenticating at a cellular network. This is in particular carried out with an UICC, or eUICC.

Additionally the user equipment comprises a power supply, preferably a battery, which can be recharged and/or replaced. For special types of user equipments, in particular those belonging to the group of IoT-devices, such battery shall last for a remarkable long time, e.g. calculated in years. In particular for such devices it is preferable to operate preconfigured periodical uplink communication (PPUC) schedules.

Preferably the user equipment which is indicating not to be prepared for downlink data transmission in conjunction with a PPUC occasion, is prepared to receive downlink data over other channels, independent of the PPUC schedule. This in particular comprises being paged in case of availability of downlink data, which would need to be checked asynchronously by the serving base station, according to embodiments of the second aspect of the invention. Alternatively the user equipment regularly—but much more rare compared to the frequency of PPUC occasions—checks through a request message via the base station, if downlink data are available.

The fourth aspect of the invention shares the advantages of the third aspect of the invention.

As it is shown this invention advantageously solves the depicted problem and proposes a solution where both the base station and the user equipments with their different needs are supported without any constraints in terms of regular functionality or flexibility.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows for a user equipment 1 operating with a base station 2, here an eNB, of a cellular network 3, here in particular a 4G Core the procedure of a preconfigured periodical uplink communication (PPUC), here a D-PUR communication.

Figure 1:
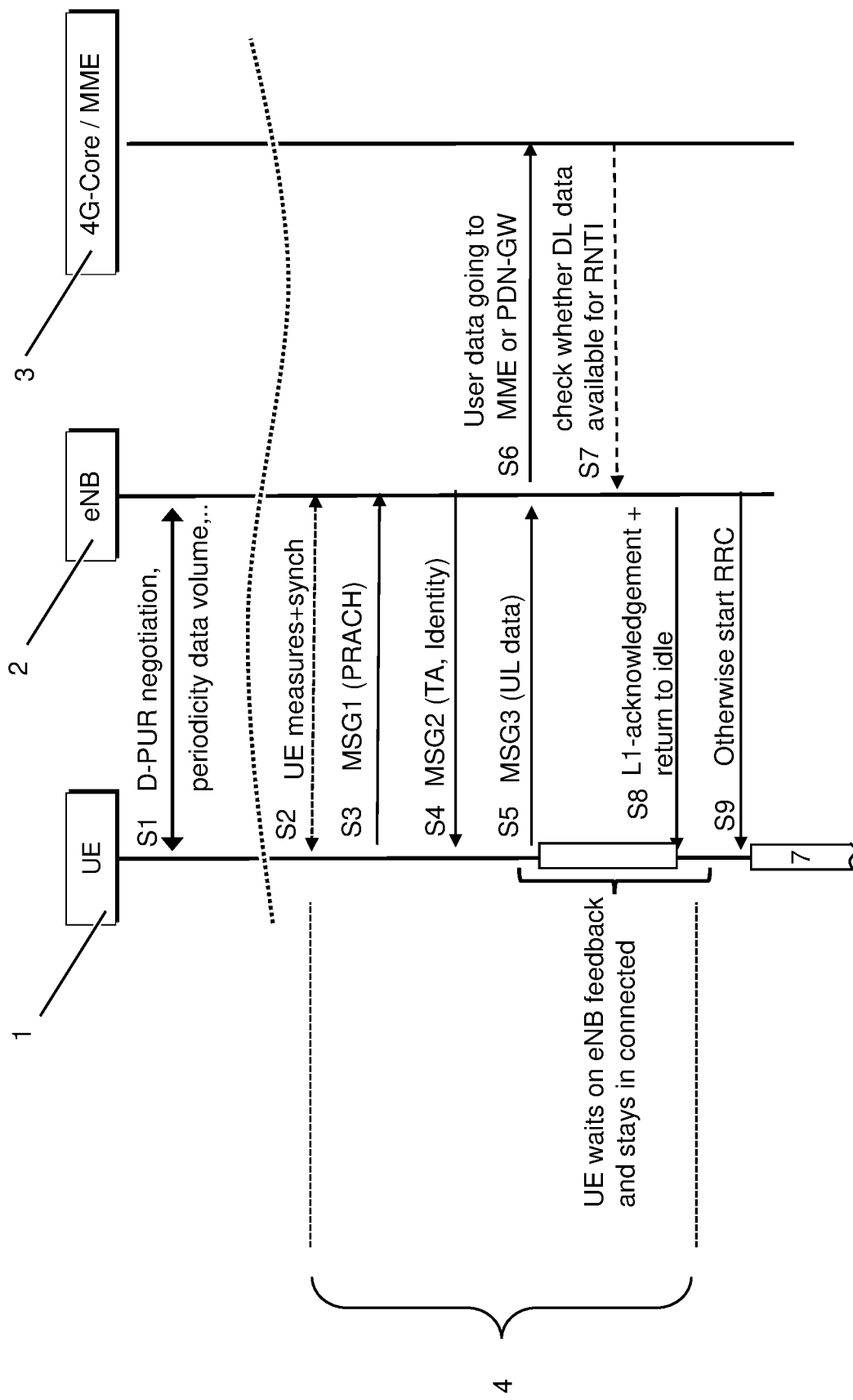
FIG. 1 represents a flow chart of a method of the type according to the prior art.

The figure shows exactly the flow within one PPUC occasion, i.e. after the D-PUR configuration where density, periodicity and TBS size for the PPUC were negotiated for said UE identified by its identity.

To set this up, the user equipment and the base station negotiate in step S1 the D-PUR schedule. This negotiation at least defines the periodicity, e.g. in terms of seconds, minutes, system frame numbers, and the amount of data that may be transmitting during one PPUC occasion 4. This is happening in particular after the user equipment 1 successfully registered in the network and decided to camp on said base station, which herewith becomes the serving base station.

Preferably both the user equipment 1 and the base station 2 start a timer with the periodicity. After the timers indicate that the period of time until the next PPUC occasion 4 has passed, the preparation for the data transmission during the PPUC occasion 4 take place with step S2.

The user equipment 1 is at least operating in idle mode, possibly even in a sleep mode, which might require to synchronize on the serving base station 2 again, carry out measurements, in particular if the serving base station is still suitably receivable, further system information from the base station may be read etc.

When this has happened the user equipment 1 is able to send in step S3 the first message with the PRACH preamble to the base station 2. With step S4 the base station 2 answers, indicating timing advance value and a temporary UE identity.

With this information the user equipment may send in step S5 with the third message, in fact the data message, an uplink data packet of the size as negotiated in step S1 to the base station. The uplink data are usually forwarded as shown in step S6 to a remote server via the PDN-Gateway.

Additionally then the base station starts based on the temporary UE identity, in particular the RNTI, to check if downlink data are available for this user equipment. This might be the case in the cellular network, or after requesting the remote server.

Depending upon the outcome the following steps are carried out. In particular when no downlink data are available, the step S8 is carried out, where in a layer-1 acknowledgement it is indicated to the user equipment that the data are correctly arrived. If not, a retransmission could be initiated by the user equipment, i.e. opening a dedicated cannel via resource request and doing a transmission.

However for other applications there may be only the need that one out of several transmissions reaches the server when done with redundancy, hence the UE behavior should be left to implementation.

In general it is important that for those cases where no re-transmission is considered anyway the user equipment returns to the idle mode as soon as possible, in particular out of power saving reasons.

The latter is not the case, when in step S7 it was detected that downlink data are indeed available for this user equipment. Then in step S9 a RRC data connection 7 is started.

It is visible, that to wait for the feedback from the eNB 2 takes a remarkable amount of time, in particular when executed each time for the task of searching for the availability downlink data, which is in a plurality of user equipments, in particular IoT-devices, only exceptionally the case.

Figure 2:
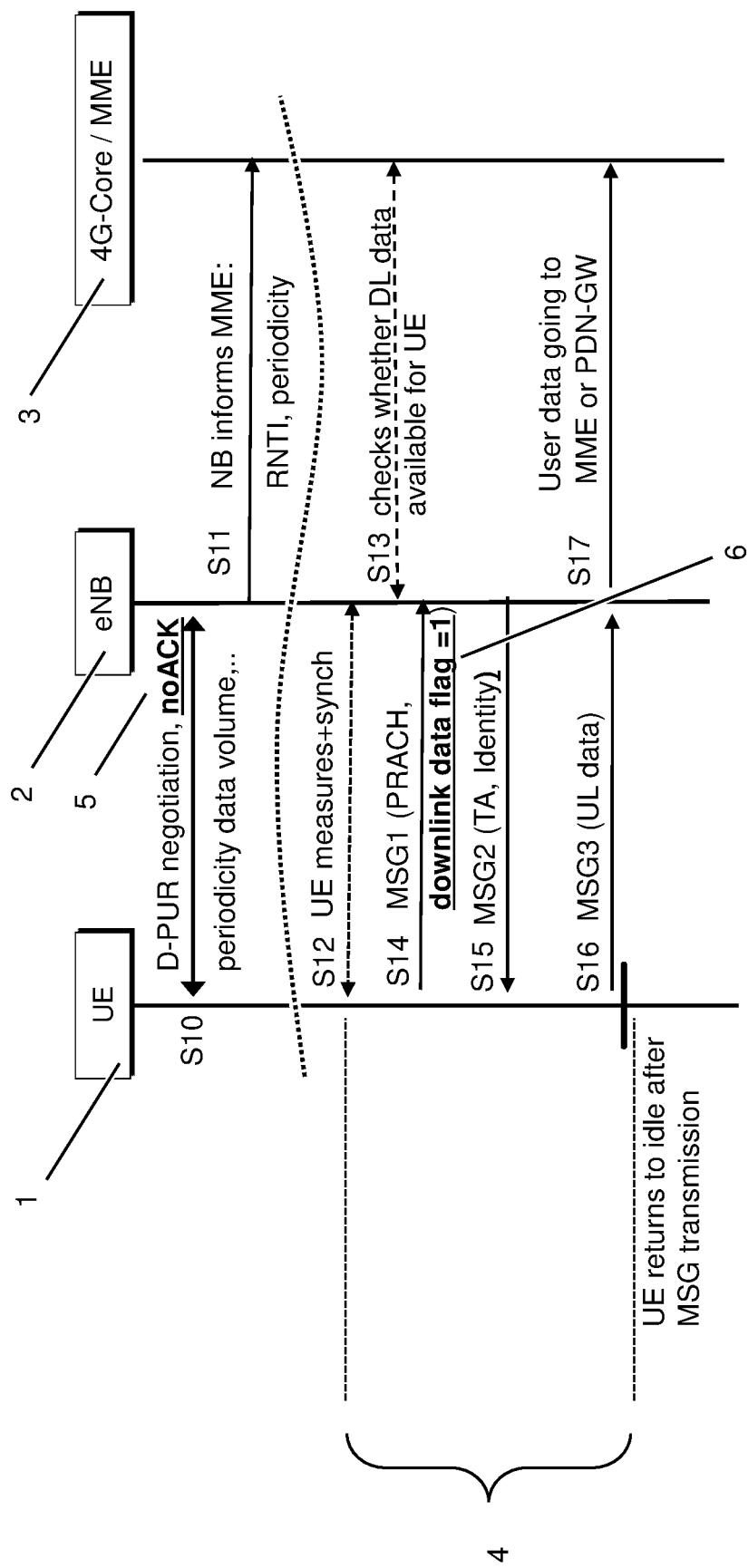
FIG. 2 represents a flow chart of a first exemplifying method of the type to which the present invention is applied as an embodiment.

Therefore FIG. 2 shows in an exemplifying embodiment of the invention a more advantageous workflow. The first difference becomes visible in the negotiation phase S10, where the acknowledge flag 5 (noACK) is submitted by the user equipment to the base station. With that the user equipment has the chance to inform the base station, that it is not expecting a layer-1 acknowledgment of the data message. In the shown example the flag noACK is set to true—no acknowledgement is expected.

Then in step S13, which can even take place prior to the start of the PPUC occasion 4, the base station 2 and the core network 3 check, if downlink data are available for the user equipment. Prior the PPUC occasion the PPUC scheduling, i.e. the so called D-PUR configuration was negotiated with the eNodeB, and by this pre-configuration the eNodeB knows when which UE will come up for a PPUC occasion, i.e. depicted by the UE identity, where here the RNTI is used as an example.

However, in this example with message S14 the user equipment submits to the base station also the downlink data flag 6, indicating if the user equipment is prepared to receive downlink data or not. In this example this is submitted with the first message S14, it could also be submitted during the negotiating phase. However it is advantageous to do it with message S14, as this allows e.g. once a day to check for downlink data.

Here it is indicated with downlink data flag=1, that the user equipment is not prepared to receive downlink data.

Hence after submitting the uplink data with message 3 in step S16 the user equipment 1 can directly switch to idle mode. The user equipment indicated with the acknowledge flag 5 not to get layer-1 acknowledgment messages and with the downlink data flag 6 not to be prepared to receive downlink data, therefore it can stop the PPUC occasion 4 immediately after submission in step S16 and return to idle.

The reduction of time for waiting for a) checking of downlink data are available and b) if the data transmission was successful is evident. And with the time saving, also a power saving for the user equipment and a reduction of signalling for the base station comes hand in hand.

Figure 3:
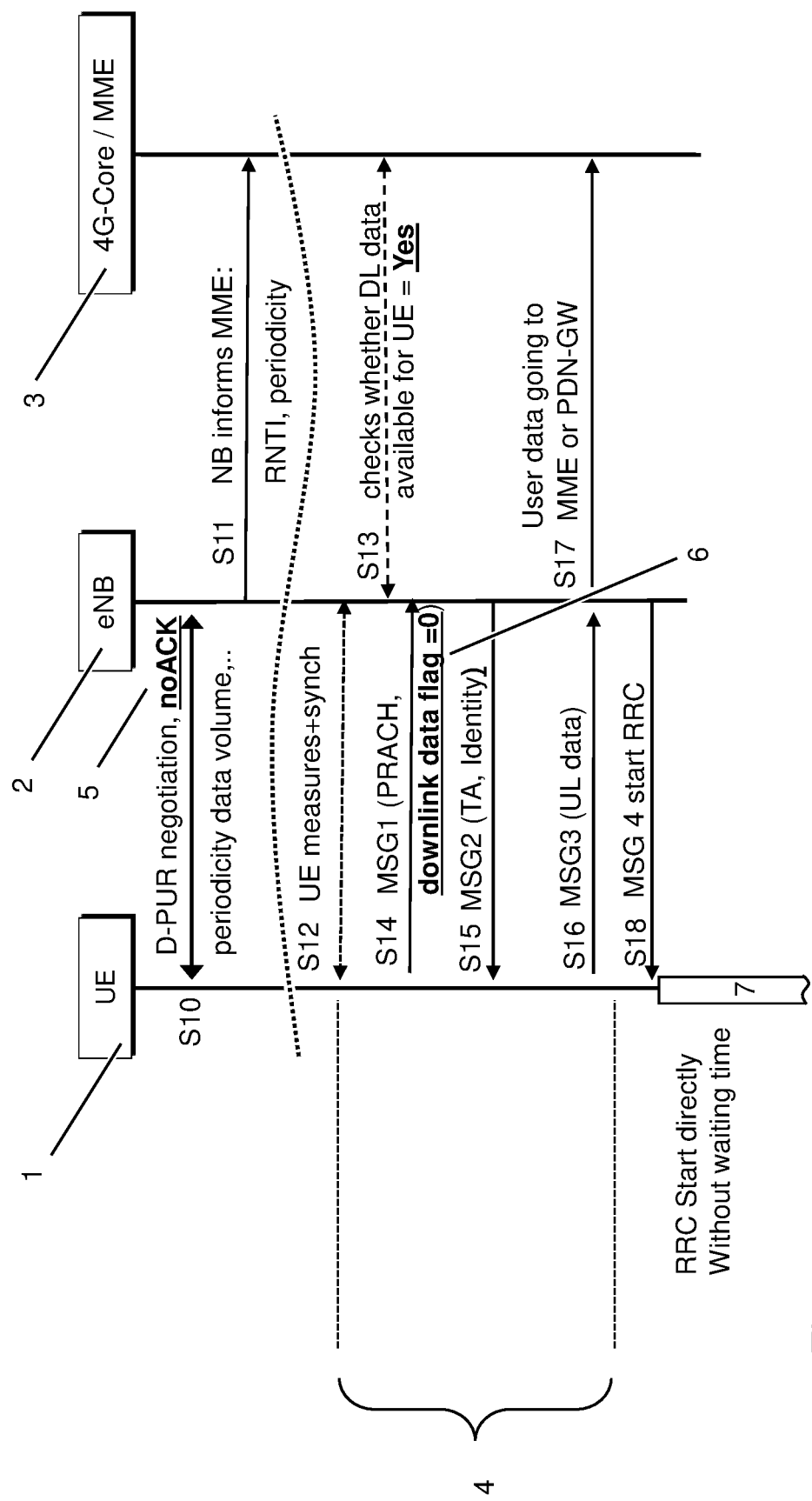
FIG. 3 represents a flow chart of a second exemplifying method of the type to which the present invention is applied as an embodiment.

In FIG. 3 a variant of the exemplifying embodiment of the invention is shown, which clarifies the flexibility of the proposed solution.

Here the same procedure is carried out as shown in FIG. 2. The same message has the same reference number.

The difference starts with the detection in step S13, that the check for downlink data for the user equipment indicates that data are indeed available.

Additionally in step S14 the user equipment submits this time with the first message the downlink data flag 6 which indicates that the user equipment 1 is prepared to receive downlink data.

Consequently, after submitting the data packet with the third message in step S16, with the MSG4 in step S18 the RRC connection 7 is started and a downlink data transmission through the base station 2 to the user equipment 1 can happen.

Nonetheless, even though downlink data transmission is allowed now, the PPUC occasion 4 is still not timewise extended through this change. This shows, that the proposed solution also offers a flexibility without losing the advantages of the general proposal.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. The method to operate a base station being part of a cellular network, said base station being configured for conducting a preconfigured periodical uplink communication schedule with at least one user equipment,
   the method comprising the step for the base station of negotiating with the user equipment for setting up the preconfigured periodical uplink communication schedule,
   further comprising receiving a downlink data flag indicating if the user equipment is prepared to receive downlink data in conjunction with at least one preconfigured periodical uplink communication occasion,
   after setup of the preconfigured periodical uplink communication schedule, allocating network resources at a time synchronized with the preconfigured periodical uplink communication schedule of a data transmission as part of a preconfigured periodical uplink communication occasion,
   wherein a check for availability of downlink data for the user equipment is evaluated in advance of the next preconfigured periodical uplink communication occasion only in case the downlink data flag indicates to check for downlink data,
   and the method further comprising for the base station during said preconfigured periodical uplink communication occasion:
      receiving uplink data from the user equipment with a data message,
      only if the check for availability of downlink data indicates availability of downlink data, then sending an indication to the user equipment for setting up a downlink data connection, and
   if the check for availability of downlink data indicates no availability of downlink data, then causing the user equipment to return to idle mode immediately after receipt of the uplink data is complete.

2. The method according to claim 1,
   further comprising receiving an acknowledge flag indicating if acknowledged communication is preferred by the user equipment as part of the negotiating step,
   wherein after the step of receiving uplink data from the user equipment submitting a layer-1 acknowledgement message only in case said acknowledge flag indicates that acknowledged communication is preferred.

3. The method according to claim 2, wherein the layer-1 acknowledgement message further comprises said indication for setting up the downlink data connection.

4. The method according to claim 2, wherein the availability check comprises the steps of requesting from at least one cellular network component if data dedicated for said user equipment are available for downlink transmission.

5. The method according to claim 4, wherein in case of availability of downlink data and said downlink data flag indicating that the user equipment is not prepared to receive downlink data, sending a message asynchronously to the preconfigured periodical uplink communication by means of paging to the user equipment.

6. A base station being part of a cellular network, said base station being configured to conduct a preconfigured periodical uplink communication schedule with at least one user equipment,
wherein the base station is configured to negotiate with the user equipment for setting up the preconfigured periodical uplink communication schedule,
further receiving a downlink data flag indicating if the user equipment is prepared to receive downlink data in conjunction with at least one preconfigured periodical uplink communication occasion,
after setup of the preconfigured periodical uplink communication schedule, the base station is configured:
to allocate network resources at a time synchronized with the preconfigured periodical uplink communication schedule of a data transmission as part of a preconfigured periodical uplink communication occasion,
to evaluate a check for availability of downlink data for the user equipment in advance of the next preconfigured periodical uplink communication occasion only in case the downlink data flag indicates to check for downlink data,
and the base station is further configured during said preconfigured periodical uplink communication occasion to:
receive uplink data from the user equipment with a data message,
only if the check for availability of downlink data indicates availability of downlink data, then send an indication to the user equipment for setting up a downlink data connection, and
if the check for availability of downlink data indicates no availability of downlink data, then cause the user equipment to return to idle mode immediately after receipt of the uplink data is complete.

7. The base station according to claim 6,
further configured to receive an acknowledge flag indicating if acknowledged communication is preferred by the user equipment as part of the negotiating step,
wherein the base station is configured after receiving uplink data from the user equipment to submit a layer-1 acknowledgement message only in case said acknowledge flag indicates that acknowledged communication is preferred.

8. The base station according to claim 7, wherein the layer-1 acknowledgement message further comprises said indication for setting up the downlink data connection.

9. The base station according to claim 7, wherein the availability check comprises to request from at least one cellular network component if data dedicated for said user equipment are available for downlink transmission.

10. The base station according to claim 7, further configured, in case of availability of downlink data and said downlink data flag indicating that the user equipment is not prepared to receive downlink data, to send a message asynchronously to the preconfigured periodical uplink communication by means of paging to the user equipment.

11. A method for a user equipment being configured for conducting preconfigured periodical uplink communication with a base station of a cellular network,
the method comprising the step for the user equipment of negotiating with the base station for setting up the preconfigured periodical uplink communication schedule,
further comprising:
sending a downlink data flag indicating to be prepared to receive downlink data in conjunction with at least one preconfigured periodical uplink communication occasion,
and the method further comprising during said preconfigured periodical uplink communication occasion:
sending uplink data from to the base station with a data message,
only if the downlink data flag indicates that the user equipment is prepared to receive downlink data, then receiving an indication from the base station for setting up a downlink data connection, and
if the downlink data flag does not indicate that the user equipment is prepared to receive downlink data, then returning to idle mode immediately after sending the uplink data without waiting for the indication from the base station.

12. The method according to claim 11,
further comprising sending an acknowledge flag indicating if acknowledged communication is preferred by the user equipment as part of the negotiating step,
wherein after the step of sending uplink data from the user equipment receiving a layer-1 acknowledgement message only in case said acknowledge flag indicates that acknowledged communication is preferred.

13. The method according to claim 12, wherein the layer-1 acknowledgement message further comprises said indication for setting up the downlink data connection.

14. A user equipment being configured for conducting preconfigured periodical uplink communication with a base station of a cellular network,
wherein the user equipment is configured to negotiate with the base station for setting up the preconfigured periodical uplink communication schedule,
and to send a downlink data flag indicating to be prepared to receive downlink data in conjunction with at least one preconfigured periodical uplink communication occasion,
and the user equipment is further configured during said preconfigured periodical uplink communication occasion to:
send uplink data from to the base station with a data message,
only if the downlink data flag indicates that the user equipment is prepared to receive downlink data, then receive an indication from the base station for setting up a downlink data connection, and
if the downlink data flag does not indicate that the user equipment is prepared to receive downlink data, then return to idle mode immediately after sending the uplink data without waiting for the indication from the base station.

15. The user equipment according to claim 14,
further configured to send an acknowledge flag indicating if acknowledged communication is preferred by the user equipment as part of the negotiating step,
wherein the user equipment is further configured after sending uplink data to receive a layer-1 acknowledgement message only in case said acknowledge flag indicates that acknowledged communication is preferred.

16. The user equipment according to claim 15, wherein the layer-1 acknowledgement message further comprises said indication for setting up the downlink data connection.

\* \* \* \* \*